United States Patent [19]

Conner, Jr.

[11] 4,175,763
[45] Nov. 27, 1979

[54] SUSPENSION SYSTEM FOR LAND VEHICLES

[75] Inventor: William R. Conner, Jr., Shelbyville, Tenn.

[73] Assignee: Kellwood Company, St. Louis, Mo.

[21] Appl. No.: 928,736

[22] Filed: Jul. 28, 1978

[51] Int. Cl.² ............................................... B60P 1/00
[52] U.S. Cl. .................................. 280/104; 280/677;
 280/111
[58] Field of Search ............... 280/104, 677, 678, 679, 280/680, 681, 111, 112 R, 788; 267/11 R

[56] References Cited

U.S. PATENT DOCUMENTS

| | | | |
|---|---|---|---|
| 2,874,973 | 2/1959 | Botkin | 280/677 |
| 2,914,338 | 11/1959 | Kress | 280/104 |
| 3,451,692 | 6/1969 | Kappe | 280/678 |
| 3,726,540 | 4/1973 | Grooss | 280/677 |

*Primary Examiner*—Joseph F. Peters, Jr.

*Assistant Examiner*—John A. Carroll
*Attorney, Agent, or Firm*—Koenig, Senninger, Powers and Leavitt

[57] ABSTRACT

A vehicle comprises a frame, wheel carriers spaced longitudinally of the frame, and wheels on the carriers. A suspension system supports the frame on the carriers with connections between the frame and the carriers allowing relative rocking movement of the frame and each carrier about an axis extending generally longitudinally and centrally of the vehicle. Linkages between the carriers on opposite sides of the axis each comprise bell cranks having a first arm interengageable with the respective carrier and a second arm, and a tension link interconnecting the second arms, adapted to effect relative rocking movement in one direction of one carrier and the frame on relative rocking movement of the other carrier and the frame in the opposite direction, and vice versa.

33 Claims, 10 Drawing Figures

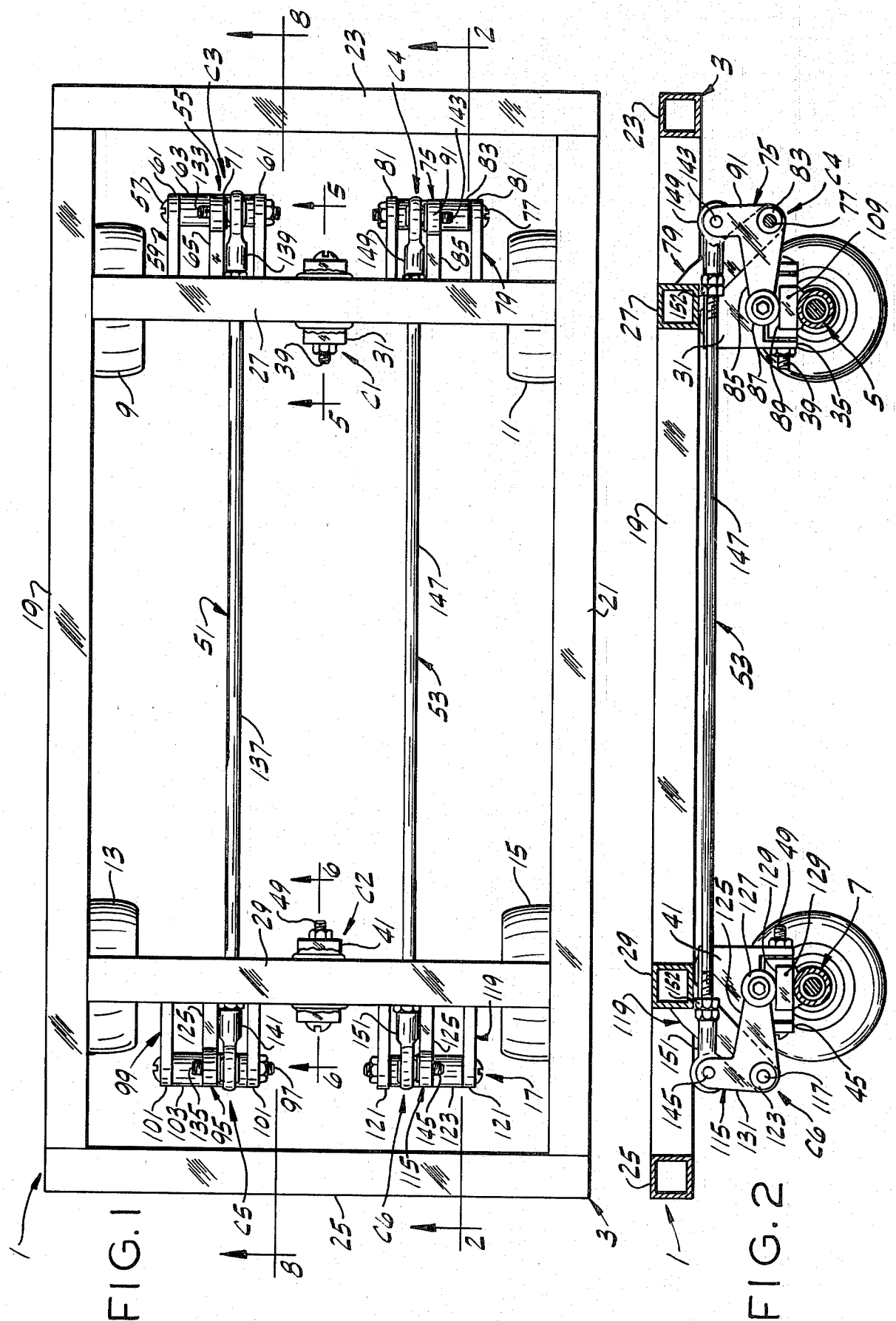

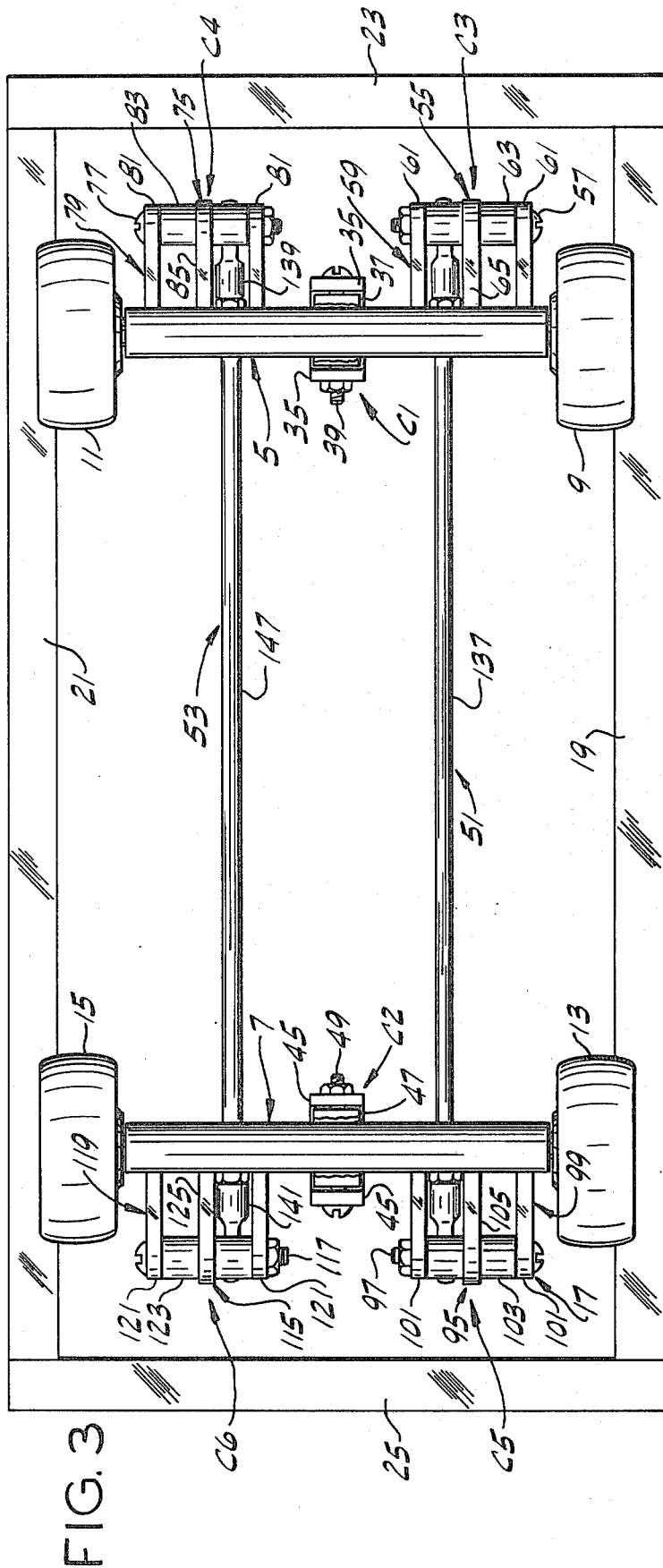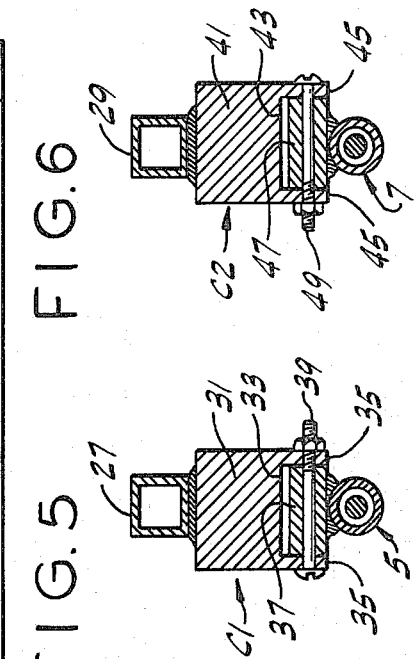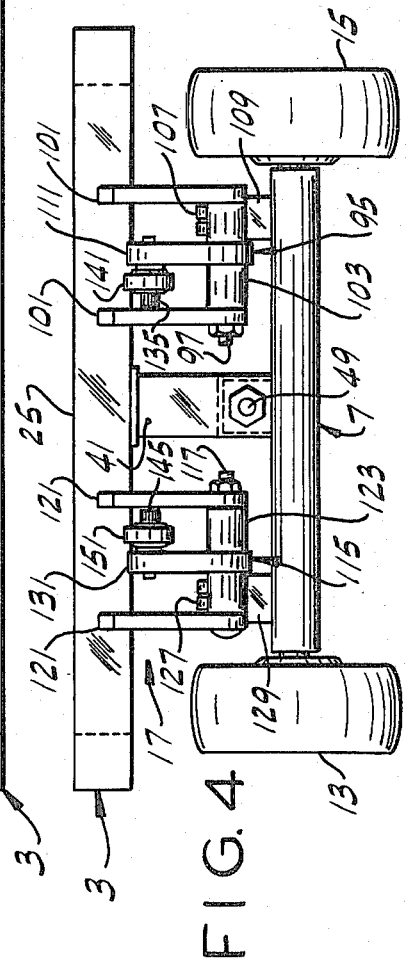

SUSPENSION SYSTEM FOR LAND VEHICLES

BACKGROUND OF THE INVENTION

This invention relates to suspension systems for land vehicles, and more particularly to suspension systems for wheeled vehicles such as railway vehicles, i.e., railway locomotives and railway cars, tractors, trailers, etc.

The invention is especially concerned with a suspension system for any wheeled vehicle which may travel over uneven surfaces, e.g., railway vehicles which may travel over uneven track, tractors, or similar vehicles which may travel over uneven terrain, etc. In travelling over uneven surfaces, wheeled vehicles may be caused to rock or sway from side to side, often to the extent that the vehicle overturns. Railway vehicles may derail. The rocking or swaying is a problem not only because it may make the ride uncomfortable for riders of the vehicle, or may cause shifting of cargo and damage thereto, or even overturn the vehicle, but also because extra propulsive power is required to overcome the unevenness of the surface (e.g., track or terrain) over which the vehicle is travelling, thus wasting energy. Also, it imposes increased strain on the vehicle and may require design of the vehicle with oversized components to take the increased strain, thus increasing the cost of building the vehicle.

SUMMARY OF THE INVENTION

Among the several objects of the invention may be noted the provision of an improved suspension system for wheeled land vehicles adapted to increase the stability of the vehicle as it travels over uneven surfaces, e.g., to increase the stability of railway vehicles which may travel over uneven track, and tractors or similar vehicles which may travel over uneven terrain, thereby to provide a smoother ride with less rocking or swaying than conventional suspensions; the provision of such a suspension system which is suitable for wheeled vehicles which have a relatively long wheelbase, e.g., railway vehicles; the provision of such a suspension system which stabilizes the load by generally equalizing the loading on the wheels of the vehicle without requiring any massive components; the provision of such a suspension system which, in stabilizing the vehicle as it travels over uneven surfaces, reduces the power required to propel the vehicle and thus reduces the energy required for propulsion; and the provision of such a suspension system which is economical to provide on a vehicle, and of simple, low-maintenance, long-lived construction.

In general, a vehicle of this invention comprises a frame, first and second wheel carriers spaced longitudinally of the frame, wheels carried by the wheel carriers at opposite sides of the vehicle, and a suspension system for supporting the frame on the wheel carriers. The suspension system comprises six connections between the frame and the carriers. The first connection is between the frame and the first carrier generally centrally of the first carrier. It transfers part of the weight of the frame to the first carrier and allows the frame and the first carrier to rock relative to one another about an axis extending generally longitudinally of the vehicle. The second connection is between the frame and the second carrier generally centrally of the second carrier. It transfers part of the weight of the frame to the second carrier and allows the frame and the second carrier to rock relative to one another about an axis extending generally longitudinally of the vehicle. The third connection is between the frame and the first carrier on one side of the first connection for transmitting force from the first carrier to the frame on said one side of the first connection. The fourth connection is between the frame and the first carrier on the other side of the first connection for transmitting force from the first carrier to the frame on said other side of the first carrier. The third and fourth connections permit the relative rocking movement of the frame and the first carrier. The fifth connection is between the frame and the second carrier on one side of the second connection for transmitting force from the second carrier to the frame on said one side of the second connection. The sixth connection is between the frame and the second carrier on the other side of the second connection for transmitting force from the second carrier to the frame on said other side of the second connection. The fifth and sixth connections permit the relative rocking movement of the frame and the second carrier. A first means interconnecting said third and fifth connections transmits force from the first carrier to the second carrier on relative rocking movement of the first carrier and the frame in one direction and causes relative rocking movement of the second carrier and the frame in the opposite direction, and transmits force from the second carrier to the first carrier on relative rocking movement of the second carrier and the frame in said one direction and causes relative rocking movement of the first carrier and the frame in the opposite direction. A second means interconnecting said fourth and sixth connections transmits force from the first carrier to the second carrier on relative rocking movement of the first carrier and the frame in said opposite direction and causes relative rocking movement of the second carrier and the frame in said one direction, and transmits force from the second carrier to the first carrier on relative rocking movement of the second carrier and the frame in said opposite direction and causes relative rocking movement of the first carrier and the frame in said one direction.

Other objects and features will be in part apparent and in part pointed out hereinafter.

BRIEF DESCRIPTION OF THE DRAWINGS

FIG. 1 is a plan of a vehicle having a suspension system of this invention, the vehicle being shown in a simplified manner representative of a wide variety of vehicles;

FIG. 2 is a longitudinal vertical section of the vehicle on line 2—2 of FIG. 1;

FIG. 3 is a bottom plan of the vehicle;

FIG. 4 is a left end elevation of the vehicle, showing the vehicle on a level, even surface;

FIG. 5 is a vertical section on line 5—5 of FIG. 1;

FIG. 6 is a vertical section on line 6—6 of FIG. 1;

Corresponding reference characters indicate corresponding parts throughout the several views of the drawings.

DESCRIPTION OF THE PREFERRED EMBODIMENTS

Figure 7:
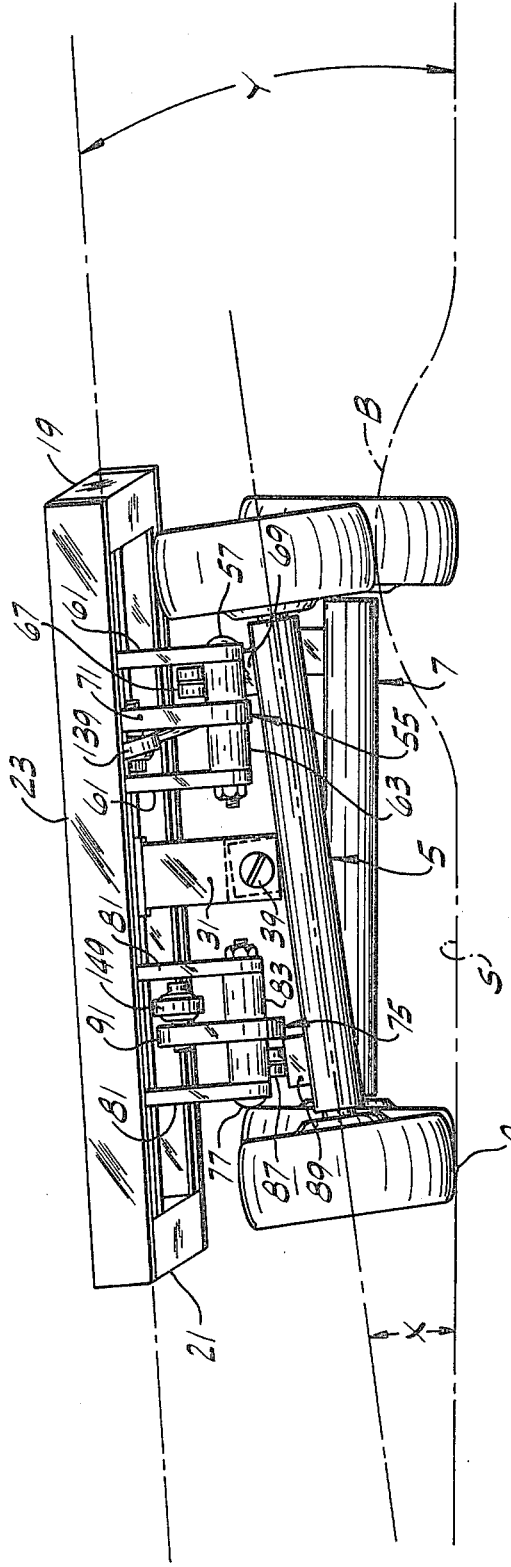
FIG. 7 is a right end elevation of the vehicle, showing one of the wheels of the vehicle travelling over a bump.

Referring to the drawings, first more particularly to FIGS. 1-4, there is generally indicated at 1 a vehicle comprising a frame 3, first and second wheel carriers 5 and 7 spaced longitudinally of the frame, wheels 9 and 11 carried by the first carrier 5 at opposite sides of the vehicle, wheels 13 and 15 carried by the second carrier 7 at opposite sides of the vehicle, and a suspension system designated in its entirety by the reference numeral 17 for supporting the frame on the wheel carriers.

The frame 3, as illustrated, is a simple rectangular frame, representative of various vehicle frames, comprising side members 19 and 21, and members 23 and 25 and cross-frame members 27 and 29 extending between the side members adjacent the end members. Each of the wheel carriers 5 and 7, as illustrated, is a rigid axle having the respective wheels journalled at its ends in a conventional manner. The suspension system 17 supports the frame 3 on the wheel carriers or axles 5 and 7, the weight of the frame and whatever is carried by the frame (e.g., the vehicle body) being transferred to and taken by the wheel carriers or axles. The suspension system 17 comprises six connections between the frame 3 and the wheel carriers 5 and 7, these connections being generally designated C1-C6.

The first connection C1 is a pivotal connection between the frame 3 and the first wheel carrier 5 located generally centrally of the first wheel carrier. It transfers part of the weight of the frame to the first carrier 3 and allows the frame and the first carrier to rock relative to one another about an axis extending generally longitudinally and generally centrally of the vehicle. This first connection, as shown in detail in FIG. 5, comprises a clevis block 31 rigid with the frame welded to and extending down from the cross-frame member 27 at the center of the latter. The block is recessed at its lower end as indicated at 33 providing extensions 35 spaced longitudinally of the vehicle. The wheel carrier or axle 5 has a lug 37 welded on its top at its center received in the recess between the extensions, and is pivotally connected to the block for rocking about the stated axis by means of a pin 39 extending through the extensions 35 and the lug 37. The pin extends longitudinally of the vehicle in the central longitudinal vertical plane of the vehicle.

The second connection C2 is a pivotal connection between the frame and second wheel carrier 7 located generally centrally of the second wheel carrier. It transfers part of the weight of the frame to the second carrier and allows the frame and the second carrier to rock relative to one another about an axis extending generally longitudinally and generally centrally of the vehicle. This second connection, which is similar to the first, comprises a clevis block 41 rigid with the frame welded to and extending down from the cross-frame member 29 at the center of the latter. The block has a recess 43 at its lower end providing extensions 45 spaced longitudinally of the vehicle. The wheel carrier or axle 7 has a lug 47 welded on its top at its center received in the recess between the extensions, and is pivotally connected to the block for rocking about the stated axis by means of a pin 49 extending through the extensions and the lug 47. The pin 49 extends longitudinally of the vehicle in the central longitudinal vertical plane of the vehicle coaxial with pin 39.

The third connection C3 is a connection between the frame 3 and the first wheel carrier 5 on one side of the first connection C1 for transmitting force from the first wheel carrier 5 to the frame on said one side of the first connection C1, and the fourth connection C4 is a connection between the frame 3 and the first wheel carrier 5 on the other side of the first connection C1 for transmitting force from the first wheel carrier 5 to the frame on said other side of the first connection C1. The third and fourth connections permit the relative rocking movement of the frame and the first wheel carrier on the pin 39.

The fifth connection C5 is a connection between the frame 3 and the second wheel carrier 7 on the one side of the first connection C2 for transmitting force from the second wheel carrier 7 to the frame on said one side of the second connection C2, and the sixth connection C6 is a connection between the frame 3 and the second wheel carrier 7 on the other side of the first connection C1 for transmitting force from the second wheel carrier 7 to the frame on said other side of the second connection C2. The fifth and sixth connections permit the relative rocking movement of the frame and the second wheel carrier on the pin 49.

At 51 is indicated a first means which interconnects the third and fifth connections C3 and C5, as will appear, for transmitting force from the first wheel carrier 5 to the second wheel carrier 7 on relative rocking movement of the first wheel carrier 5 and the frame 3 in one direction and causing relative rocking movement of the second wheel carrier 7 and the frame 3 in the opposite direction, and for transmitting force from the second wheel carrier 7 to the first wheel carrier 5 on relative rocking movement of the second carrier and the frame in said one direction and causing relative rocking movement of the first wheel carrier and the frame in the opposite direction. Thus, considering that the vehicle is viewed from its right end in FIG. 1, when the first wheel carrier 5 rocks counterclockwise relative to the frame (see FIG. 7), force is transmitted from the first wheel carrier 5 via connection C3, means 51 and connection C5 to the second wheel carrier and causes the second wheel carrier 7 to rock clockwise relative to the frame, and when the second wheel carrier 7 rocks counterclockwise relative to the frame, force is transmitted from the second wheel carrier 7 via connection C5, means 51 and connection C3 to the first wheel carrier 5 to cause the first wheel carrier 5 to rock clockwise relative to the frame.

At 53 is indicated a second means which interconnects the fourth and sixth connections C4 and C6, as will appear, for transmitting force from the first wheel carrier 5 to the second wheel carrier 7 on relative rocking movement of the first wheel carrier 5 and the frame 3 in the said opposite direction and causing relative rocking movement of the second wheel carrier 7 and the frame 3 in the said one direction, and for transmitting force from the second wheel carrier 7 to the first wheel carrier 5 on relative rocking movement of the second carrier and the frame in said opposite direction and causing relative rocking movement of the first wheel carrier and the frame in said one direction. Thus, considering that the vehicle is viewed from its right end in FIG. 1, when the first wheel carrier 5 rocks clockwise relative to the frame, force is transmitted from the first wheel carrier 5 via connection C4, means 53 and connection C6 to the second wheel carrier and causes the second wheel carrier 7 to rock counterclockwise relative to the frame, and when the second wheel carrier 7 rocks clockwise relative to the frame, force is transmitted from the second wheel carrier 7 via connection C6, means 51 and connection C4 to the first wheel carrier 5 to cause the first wheel carrier 5 to rock counterclockwise relative to the frame.

Each of the third and fourth connections C3 and C4 comprises means for unidirectionally transmitting force between the first wheel carrier 5 and the frame 3 on the respective side of the first connection C1, and each of the fifth and sixth connections C5 and C6 comprises means for unidirectionally transmitting force between the second wheel carrier 7 and the frame 3 on the respective side of the second connection.

More particularly, the third connection C3 comprises crank means 55 and specifically a bell crank having a pivotal connection at 57 with support means 59 extending down from the cross-frame member 27 adjacent the first wheel carrier 5. The support means 59 comprises a pair of arms 61 angled downwardly and outwardly toward the adjacent end of the frame. The bell crank 55 has a hub 63 rotatable on a pin at 57 extending between the arms 61 at their lower ends, a first arm 65 extending over the first wheel carrier 5 and having a roller 67 at its free end interengageable with a block 69 welded on top of the first wheel carrier 5 on the respective side of connection C1, and an upwardly extending second arm 71.

The fourth connection C4, similar to the third connection, comprises crank means 75 and specifically a bell crank having a pivotal connection at 77 with support means 79 extending down from the cross-frame member 27 adjacent the first wheel carrier 5. The support means 79 comprises a pair of arms 81 angled downwardly and outwardly toward the adjacent end of the frame. The bell crank 75 has a hub 83 rotatable on a pin at 77 extending between the arms 81 at their lower ends, a first arm 85 extending over the first wheel carrier 5 and having a roller 87 at its free end interengageable with a block 89 welded on top of the first wheel carrier 5 on the respective side of connection C1, and an upwardly extending second arm 91.

The fifth connection C5, similar to C3 and C4, comprises crank means 95 and specifically a bell crank having a pivotal connection at 97 with support means 99 extending down from the cross-frame member 29 adjacent the second wheel carrier 7. The support means 99 comprises a pair of arms 101 angled downwardly and outwardly toward the adjacent end of the frame. The bell crank 95 has a hub 103 rotatable on a pin at 97 extending between the arms 101 at their lower ends, a first arm 105 extending over the second wheel carrier 7 and having a roller 107 at its free end interengageable with a block 109 welded on top of the second wheel carrier 7 on the respective side of connection C2, and an upwardly extending second arm 111.

The sixth connection C6, similar to C3–C5, comprises crank means 115 and specifically a bell crank having a pivotal connection at 117 with support means 119 extending down from the cross-frame member 29 adjacent the second wheel carrier 7. The support means 119 comprises a pair of arms 121 angled downwardly and outwardly toward the adjacent end of the frame. The bell crank 115 has a hub 123 rotatable on a pin at 117 extending between the arms 121 at their lower ends, a first arm 125 extending over the second wheel carrier 7 and having a roller 127 at its free end interengageable with a block 129 welded on top of the second wheel carrier 7 on the respective side of connection C2, and an upwardly extending second arm 131.

The stated first means 51 which interconnects the third and fifth connections C3 and C5 comprises a tension connection and more particularly a first tension link pin-connected at its ends as indicated at 133 and 135 to the ends of arms 71 and 111, respectively, of bell cranks 55 and 95. Link 51 is of adjustable length for adjusting the tension therein, comprising a rod 137 adjustably threaded at its ends in end eye members 139 and 141, with lock nuts as indicated at 142. The pins at 133 and 135 extend through the eyes of members 139 and 141.

The stated second means 53 which interconnects the fourth and sixth connections C4 and C6 comprises a tension connection and more particularly a second tension link pin-connected at its ends as indicated at 143 and 145 to the ends of arms 91 and 131, respectively, of bell cranks 75 and 115. Link 53 is of adjustable length for adjusting the tension therein, comprising a rod 147 adjustably threaded at its ends in end eye members 149 and 151, with lock nuts as indicated at 152. The pins at 143 and 145 extend through the eyes of members 149 and 151.

The links 51 and 53 are adjusted to maintain the follower rollers in engagement with the blocks on the wheel carriers. In general, the links are adjusted so that they are under tension and thus maintain pressure engagement between the follower rollers and the blocks. The load of the frame 1 of the vehicle (including whatever is carried by the frame) is transmitted to the wheel carrier 5 at connections C1, C3 and C4 and to wheel carrier 7 at connections C2, C5 and C6, a substantial portion of the load on carrier 5 being transferred directly through connection C1 to the carrier and the remainder through connections C3 and C4. Similarly, a substantial portion of the load on carrier 7 is transferred directly through connection C2 to the carrier and the remainder through connections C5 and C6. In the course of the travel of the vehicle over an uneven surface, e.g., over uneven terrain, each of the wheel carriers 5 and 7 may rock relative to the frame 1 about the axis of the respective center pivotal connection C1, C2 as any wheel encounters an elevation or depression of the surface. Relative rocking of wheel carrier 5 and frame 1 in one direction on the axis of pin 39 induces relative rocking of the wheel carrier 7 and frame 1 on the axis of pin 49 in the opposite direction, and relative rocking of the wheel carrier 5 and frame 1 in the opposite direction on the axis of pin 39 induces relative rocking of the wheel carrier 7 and frame 1 on the axis of pin 49 in said one direction. Similarly, relative rocking of wheel carrier 7 and frame 1 in one direction on the axis of pin 49 induces relative rocking of wheel carrier 5 and frame 1 on the axis of pin 39 in the opposite direction, and relative rocking of the wheel carrier 7 and frame 1 in the opposite direction on the axis of pin 49 induces relative rocking of wheel carrier 5 and frame 1 on the axis of pin 39 in said one direction. Forces are transferred between connections C3 and C4 and between connections C5 and C6 to maintain substantially equalized loading on the wheels. With the induced relative rocking of the frame and wheel carriers about the axis of pins 39 and 49, the lateral displacement of the center of gravity of the vehicle is substantially reduced, and the forces tending to cause the vehicle to rock or swing (which are in effect related to the lateral displacement of the center of gravity and the time in which the displacement occurs) are substantially reduced in respect to conventional suspensions.

Figure 8:
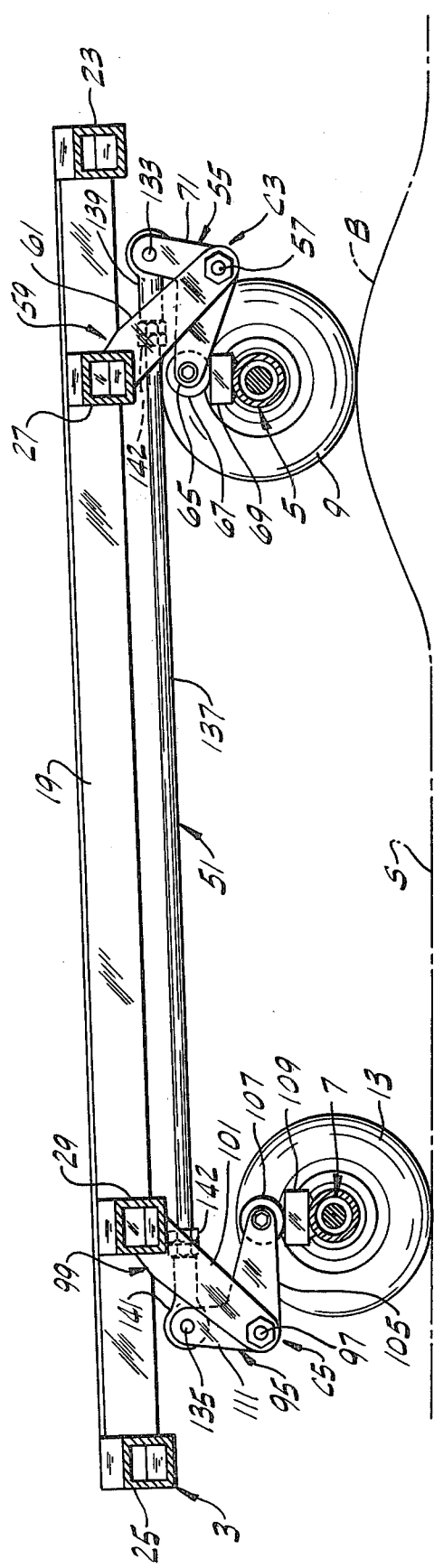
FIG. 8 is a longitudinal section of the vehicle on line 8—8 of FIG. 1, with the wheel travelling over the bump as in FIG. 7.

The action of the suspension system 17 for a condition in which the vehicle is travelling over surface S in the direction from left to right as viewed in FIGS. 1 and 2 and wheel 9 (which is the left front wheel) encounters a bump B is illustrated in FIGS. 7 and 8. As shown therein, the front wheel carrier or axle 5 thereupon swings up counterclockwise about an axis A at the region of contact of the wheel 11 and the surface as viewed from the front of the vehicle (its right end as viewed in FIGS. 1, 2 and 8). As it swings up, block 69 on the left side of connection C2 (left being as viewed in the direction of travel of the vehicle) pushes up on the follower roller of bell crank 55 of connection C3 and rocks this bell crank clockwise as viewed in FIG. 8. Link 51 is thereby pulled forward (toward the right as viewed in FIG. 8), thereby rocking bell crank 95 of connection C5 clockwise on its pivot at 97. Arm 105 of the bell crank 95 swings up about an axis at the region of contact of the follower roller 107 with the block 109 and acts via arms 101 to raise the frame at connection C5. The frame 1, in rising at connection C5, rocks in counterclockwise direction (as viewed in FIG. 7) about the axis of pin 49 of connection C2. This brings down the arms 119 and the bell crank pivot 123 of connection C6. With roller 127 engaging block 129, bell crank 115 of connection C6 is caused to swing counterclockwise as viewed in FIG. 2 about its pivot at 117. Link 53 is thereby pulled rearward (toward the left as viewed in FIG. 2), thereby causing bell crank 75 of connection C4 to rock counterclockwise on its pivot at 77. With roller 87 engaging block 89, the bell crank 75 in rocking counterclockwise on its pivot at 77 acts via arms 81 to raise the frame at connection C4. The frame 1 and carrier 5 rock in one direction relative to one another about the axis of pin 39 (this direction being such that wheel 9 becomes closer to and wheel 11 farther from the frame), and frame 1 and carrier 7 rock in the opposite direction relative to one another about the axis of pin 49 (wheel 13 becomes farther from and wheel 15 becomes closer to the frame). That is, carrier 5 rocks counterclockwise relative to the pivot at 39 as viewed in FIG. 7, and carrier 7 rocks clockwise relative to the pivot at 49.

The above-described action is such that force is transmitted from carrier 5 to carrier 7 at the left side of the vehicle by bell crank 55 acting on link 51 to pull it forward, and link 51 acting on bell crank 95 to tend to swing its arm 105 down, thereby causing follower roller 107 to push down on block 109 and transfer force via the left side of carrier 7 to the wheel 13. Similarly, force is transmitted from carrier 7 to carrier 5 at the right side of the vehicle by bell crank 115 acting on link 53 to pull it rearward, and link 53 acting on bell crank 75 to tend to swing its arm 85 down, thereby causing follower roller 87 to push down on block 89 and transfer force via the right side of carrier 5 to the wheel 11. The action of link 51 at connection C5 has its reaction at connection C3, and the action of link 53 at connection C4 has its reaction at connection C6; bell crank 55 pushes down on block 69 and bell crank 115 pushes down on block 129. This tends to equalize forces on the wheels for stability.

Referring to FIG. 7, the end member 23 of the frame 1 is tilted up laterally in respect to the vehicle at the right of FIG. 7 (which is the left of the vehicle as viewed in the direction of forward travel) and down at the left. End member 25 is also tilted up laterally in respect to the vehicle at the right and down at the left, and the frame is inclined upwardly longitudinally with respect to the vehicle from end member 25 to end member 23 as appears in FIG. 8. The lateral tilting is substantially less than occurs under corresponding conditions in vehicles with conventional suspensions (e.g., three point suspensions) and the lateral displacement of the center of gravity of the vehicle is substantially reduced. Thus, it will be observed from FIG. 7 that while the tilt X (angle off horizontal) of the carrier 5 is about 8°, the tilt Y of end member 23 of the frame is only 4°.

It will be observed that the frame 1 is stable in longitudinal direction generally independently of connections C3–C6, since the frame is supported adjacent one end at C1 and adjacent its other end at C2; it is believed that, in general, these center pivotal connections C1 and C2 support the major part of the load of the frame. In other words, a major portion of the load is supported directly on the wheel carriers 5 and 7 at connections C1 and C2 and generally equally divided therebetween, thus providing longitudinal or fore and aft stability. The loads at C1 and C2 are equally divided among the wheels. The remainder of the load is balanced as among connections C3–C6, and the latter maintain lateral stability with said remainder of the load generally being equalized on the wheels. Thus, the loading on the wheels is generally equalized. It will be further observed that this equalization is accomplished without the use of any relative massive components; being accomplished in simple relatively lightweight manner by means of the bell cranks and tension links. With the use of the bell crank and tension link linkages as shown, or equivalents, it is possible to equalize the wheel loading of vehicles having a relatively long wheelbase (e.g., railway vehicles), with only members of relatively small cross section and light weight extending between the wheel carriers adjacent the ends of the vehicle.

Figure 9:
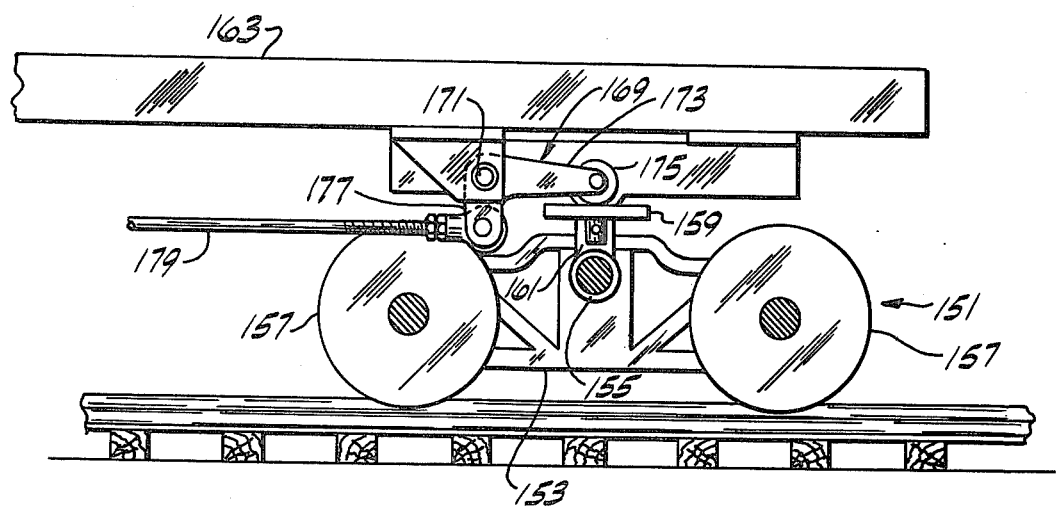
FIG. 9 is a view showing a mode of application of the invention to the railway trucks of a railway car.
Figure 10:
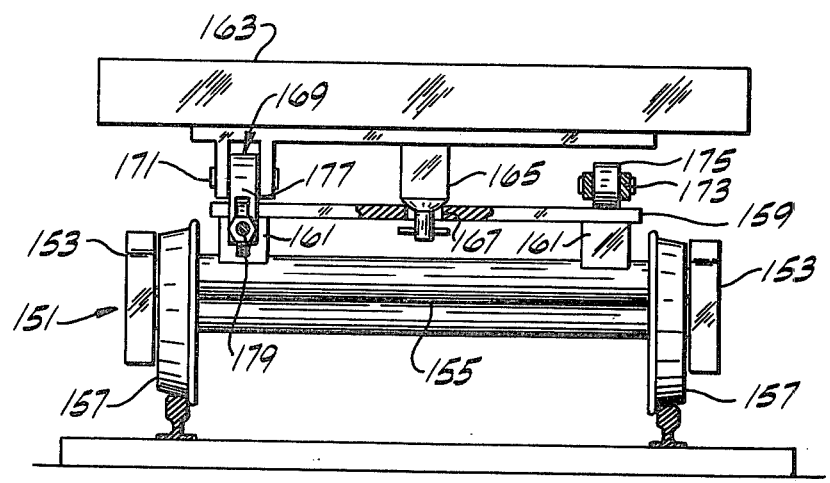
FIG. 10 is a left end elevation of FIG. 9, with parts broken away.

FIGS. 9 and 10 show how the invention may be applied to the railway trucks of a railway vehicle, showing a typical truck 151 (which is a wheel carrier) comprising side frame members each deignated 153, a cross-frame member 155 extending between the side frame members, and four wheels each designated 157. A bearing plate 159 is supported on blocks 161 on the cross-frame member. The frame of the vehicle is indicated at 163. This has a pin 165 extending down through a hole 167 in the plate, this connection being such as to permit rocking of the frame 163 relative to the truck about an axis extending generally longitudinally and centrally of the vehicle, and also to permit the truck to turn about the vertical axis of the pin, all in conventional manner. Bell cranks such as indicated at 169 are pivoted at 171 on the frame, each having an arm 173 extending over the plate 159 and carrying a follower roller 175 engaging the top of the plate 159, and a downwardly extending arm 177. While only the truck at one end of the railway vehicle is illustrated, it will be understood that there is a corresponding truck at the other end, and that bell cranks are similarly provided at the other end. The bell cranks at the one end are connected to the bell cranks at the other end by links such as indicated at 179 (similar to links 51 and 53) interconnecting the arms 177 of the two bell cranks 169 at one side and the arms 177 of the two bell cranks 169 at the other side of the vehicle. This suspension system acts in essentially the same manner as the system of FIGS. 1–8, and has the further feature that the wheel carriers (the trucks 151) may turn, as permitted by the rolling of rollers 175 on plate 159 as it turns.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vehicle comprising a frame, first and second wheel carriers spaced longitudinally of the frame, wheels carried by the wheel carriers at opposite sides of the vehicle, and a suspension system for supporting the frame on the wheel carriers, said suspension system comprising:

a first connection between the frame and the first carrier generally centrally of the first carrier, said first connection transferring part of the weight of the frame to the first carrier and allowing the frame and the first carrier to rock relative to one another about an axis extending generally longitudinally of the vehicle;

a second connection between the frame and the second carrier generally centrally of the second carrier, said second connection transferring part of the weight of the frame to the second carrier and allowing the frame and the second carrier to rock relative to one another about an axis extending generally longitudinally of the vehicle;

a third connection between the frame and the first carrier on one side of the first connection for transmitting force from the first carrier to the frame on said one side of the first connection; a fourth connection between the frame and the first carrier on the other side of the first connection for transmitting force from the first carrier to the frame on said other side of the first carrier;

said third and fourth connections permitting the relative rocking movement of the frame and the first carrier;

a fifth connection between the frame and the second carrier on one side of the second connection for transmitting force from the second carrier to the frame on said one side of the second connection;

a sixth connection between the frame and the second carrier on the other side of the second connection for transmitting force from the second carrier to the frame on said other side of the second connection;

said fifth and sixth connections permitting the relative rocking movement of the frame and the second carrier;

first means interconnecting said third and fifth connections for transmitting force from the first carrier to the second carrier on relative rocking movement of the first carrier and the frame in one direction and causing relative rocking movement of the second carrier and the frame in the opposite direction, and for transmitting force from the second carrier to the first carrier on relative rocking movement of the second carrier and the frame in said one direction and causing relative rocking movement of the first carrier and the frame in the opposite direction; and second means interconnecting said fourth and sixth connections for transmitting force from the first carrier to the second carrier on relative rocking movement of the first carrier and the frame in said opposite direction and causing relative rocking movement of the second carrier and the frame in said one direction, and for transmitting force from the second carrier to the first carrier on relative rocking movement of the second carrier and the frame in said opposite direction and causing relative rocking movement of the first carrier and the frame in said one direction.

2. A vehicle as set forth in claim 1 wherein each of the first and second interconnecting means is a tension connection.

3. A vehicle as set forth in claim 1 wherein each of said third and fourth connections comprises means for unidirectionally transmitting force between the first carrier and the frame on the respective side of the first connection and each of the fifth and sixth connections comprises means for unidirectionally transmitting force between the second carrier and the frame on the respective side of the second connection.

4. A vehicle as set forth in claim 3 wherein each of the first and second interconnecting means is a tension connection.

5. A vehicle as set forth in claim 4 having means for adjusting the tension in each said tension connection.

6. A vehicle as set forth in claim 3 wherein each unidirectional means transmits force only in the direction from the respective carrier up to the frame.

7. A vehicle as set forth in claim 6 wherein each of the first and second interconnecting means is a tension connection.

8. A vehicle as set forth in claim 7 having means for adjusting the tension in each said tension connection.

9. A vehicle as set forth in claim 1 wherein each of said third and fourth connections comprises crank means having a pivotal connection with the frame adjacent the first carrier on the respective side of the first connection for rocking movement of the crank means on an axis extending transversely of the vehicle, each of said fifth and sixth connections comprises crank means having a pivotal connection with the frame adjacent the second carrier on the respective side of the second connection for rocking movement of said crank means on an axis extending transversely of the vehicle, the first interconnecting means comprises a first link interconnecting the crank means of the third and fifth connections, and the second interconnecting means comprises a second link interconnecting the crank means of the fourth and sixth connections.

10. A vehicle as set forth in claim 9 wherein each of the first and second links is a tension link.

11. A vehicle as set forth in claim 10 having means for adjusting the tension in each of said links.

12. A vehicle as set forth in claim 9 wherein each crank means is a bell crank having a first arm interengageable with the respective carrier and a second arm, the first link interconnecting the second arms of the bell cranks of the third and fifth connections, the second link interconnecting the second arms of the bell cranks of the fourth and sixth connections.

13. A vehicle as set forth in claim 12 wherein each link comprises a rod interconnected in tension between the respective second arms.

14. A vehicle as set forth in claim 13 wherein each link is of adjustable length for adjusting the tension therein.

15. A vehicle as set forth in claim 14 wherein each bell crank is pivoted on support means extending down from the frame adjacent the respective carrier on the respective side of the respective central connection.

16. A vehicle as set forth in claim 1 wherein said connections are such as to allow the wheel carriers to turn on vertical axes at the first and second connections.

17. A vehicle as set forth in claim 12 wherein said first and second connections are such as to allow the wheel carriers to turn on vertical axes at said first and second connections, the engagement between said first arms of the bell cranks and the carriers being such as to permit the carriers to turn on said vertical axes.

18. A vehicle as set forth in claim 17 having means providing rolling contact between said carriers and said first arms of the bell cranks.

19. A vehicle comprising a frame, a first and a second set of wheels spaced longitudinally of the frame, each set comprising a wheel at one side of the vehicle and a wheel at the other side of the vehicle and a suspension system for supporting the frame on the wheels, said suspension system comprising:

a first member associated with the first set of wheels extending transversely of the vehicle;

a first connection between the frame and said first member generally centrally of said first member, said first connection being a pivotal connection which transfers part of the weight of the frame to said first member and allows the frame and said first member to rock relative to one another about an axis extending generally longitudinally of the vehicle;

a second member associated with the second set of wheels extending transversely of the vehicle;

a second connection between the frame and said second member generally centrally of said second member, said second connection being a pivotal connection which transfers part of the weight of the frame to said second member and allows the frame and said second member to rock relative to one another about an axis extending generally longitudinally of the vehicle;

a third connection between the frame and said first member on one side of the first connection for transmitting force from said first member to the frame on said one side of the first connection;

a fourth connection between the frame and said first member on the other side of the first connection for transmitting force from said first member to the frame on said other side of said first member;

said third and fourth connections permitting the relative rocking movement of the frame and said first member;

a fifth connection between the frame and said second member on one side of the second connection for transmitting force from said second member to the frame on said one side of the second connection;

a sixth connection between the frame and said second member on the other side of the second connection for transmitting force from said second member to the frame on said other side of the second connection;

said fifth and sixth connections permitting the relative rocking movement of the frame and said second member;

first means interconnecting said third and fifth connections for transmitting force from said first member to said second member on relative rocking movement of said first member and the frame in one direction and causing relative rocking movement of said second member and the frame in the opposite direction, and for transmitting force from said second member to said first member on relative rocking movement of said second member and the frame in said one direction and causing relative rocking movement of said first member and the frame in the opposite direction; and second means interconnecting said fourth and sixth connections for transmitting force from said first member to said second member on relative rocking movement of said first member and the frame in said opposite direction and causing relative rocking movement of said second member and the frame in said one direction, and for transmitting force from said second member to said first member on relative rocking movement of said second member and the frame in said opposite direction and causing relative rocking movement of said first member and the frame in said one direction.

20. A vehicle as set forth in claim 19 wherein each of the first and second interconnecting means is a tension connection.

21. A vehicle as set forth in claim 19 wherein each of said third and fourth connections comprises means for unidirectionally transmitting force between said first member and the frame on the respective side of the first connection and each of the fifth and sixth connections comprises means for unidirectionally transmitting force between said second member and the frame on the respective side of the second connection.

22. A vehicle as set forth in claim 21 wherein each of the first and second interconnecting means is a tension connection.

23. A vehicle as set forth in claim 22 having means for adjusting the tension in each said tension connection.

24. A vehicle as set forth in claim 21 wherein each unidirectional means transmits force only in the direction from the respective member up to the frame.

25. A vehicle as set forth in claim 24 wherein each of the first and second interconnecting means is a tension connection.

26. A vehicle as set forth in claim 25 having means for adjusting the tension in each said tension connection.

27. A vehicle as set forth in claim 19 wherein each of said third and fourth connections comprises crank means having a pivotal connection with the frame adjacent said first member on the respective side of the first connection for rocking movement of the crank means on an axis extending transversely of the vehicle, each of said fifth and sixth connections comprises crank means having a pivotal connection with the frame adjacent said second member on the respective side of the second connection for rocking movement of said crank means on an axis extending transversely of the vehicle, the first interconnecting means comprises a first link interconnecting the crank means of the third and fifth connections, and the second interconnecting means comprises a second link interconnecting the crank means of the fourth and sixth connections.

28. A vehicle as set forth in claim 27 wherein each of the first and second links is a tension link.

29. A vehicle as set forth in claim 28 having means for adjusting the tension in each of said links.

30. A vehicle as set forth in claim 27 wherein each crank means is a bell crank having a first arm interengageable with the respective member and a second arm, the first link interconnecting the second arms of the bell cranks of the third and fifth connections, the second link interconnecting the second arms of the bell cranks of the fourth and sixth connections.

31. A vehicle as set forth in claim 30 wherein each link comprises a rod interconnected in tension between the respective second arms.

32. A vehicle as set forth in claim 31 wherein each link is of adjustable length for adjusting the tension therein.

33. A vehicle as set forth in claim 32 wherein each bell crank is pivoted on support means extending down from the frame adjacent the respective member on the respective side of the respective central connection.

* * * * *